Sept. 6, 1960

C. J. REEDER ET AL 2,951,417

PORTABLE STEREO-VARIO VIEWING INSTRUMENT

Filed Sept. 30, 1958

INVENTORS
CHARLES J. REEDER
RAYMOND M. NELSON

BY R. S. Tompkins

ATTORNEY

United States Patent Office 2,951,417
Patented Sept. 6, 1960

2,951,417

PORTABLE STEREO-VARIO VIEWING INSTRUMENT

Charles Joseph Reeder, 1327 21st St. NW., Washington 6, D.C., and Raymond M. Nelson, Rte. 1, 141A, Gainesville, Va.

Filed Sept. 30, 1958, Ser. No. 764,458

3 Claims. (Cl. 88—29)

(Granted under Title 35, U.S. Code (1952), sec. 266)

The invention described herein may be manufactured and used by or for the Government of the United States of America for governmental purposes without the payment of any royalties thereon or therefor.

The present invention relates to a portable, scale-adjusting viewing instrument for transferring information from a photograph to another photograph of different scale. The instrument may also be used to transfer information from two photographs of varying scales to a third photograph having a third scale. More particularly, the invention utilizes stereoscopic vision by means of adjustable mirrors and prisms to transfer information from one aerial photograph to another. The instant invention relates to an instrument mounted on a stand, the stand having tables on which various photographs may be mounted. One table is to be adjustable in a vertical direction to correspond with the scale of a map positioned on said tables.

Heretofore, there has not been available a means to study a plurality of aerial photographs collectively and simultaneously to determine any changes which have taken place since the date of the earlier photograph. Prior to the use of the instant invention, it has been necessary to study each photograph individually and transfer, by inspection, any additional information found from one photograph to the other or to enlarge the photographic negative to produce both photographs at the same scale. Furthermore, it had not been possible to transfer such information rapidly and accurately using the prior method. The present invention fills the need for such a device and permits the rapid and accurate transfer of data to photographs of later date by the simultaneous study of two or more photographs of different scale.

An object of the present invention is the provision of a device for transferring information from one photograph to another photograph having a different scale.

Another object is to transfer information by aid of stereoscopic vision from two photographs of different scales to a third photograph or map of a third scale.

Still another object is to transfer information from one photograph of any scale to a map base of any scale.

A final object of the invention is to provide a means of transferring information from one or more photographs to a third photograph or map base in an efficient, rapid and accurate manner.

Other objects and many of the attendant advantages of this invention will be readily appreciated as the same becomes better understood by reference to the following detailed description when considered in connection with the accompanying drawings wherein.

Figure 1:
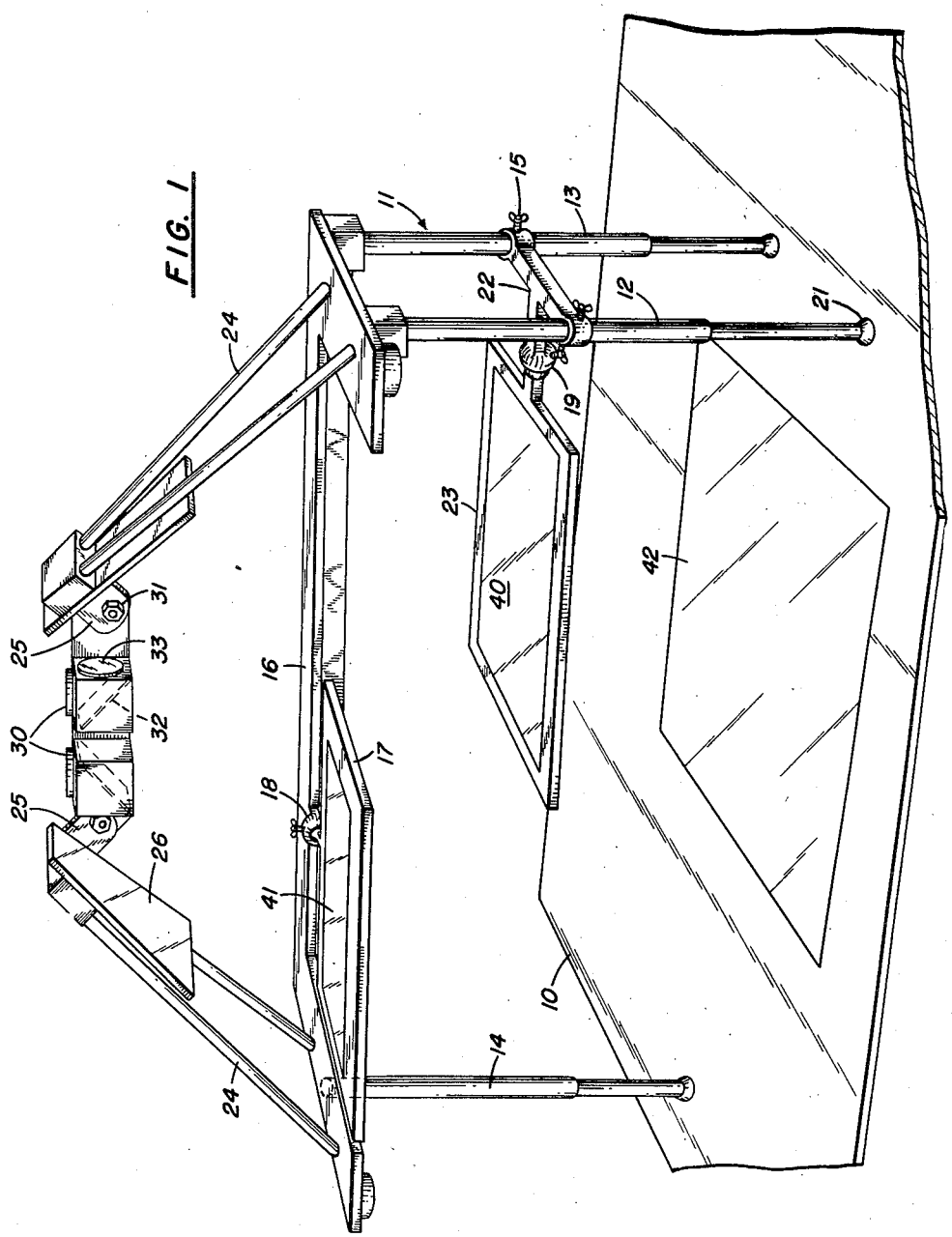
Fig. 1 shows a perspective view of the device in operation.

Referring now to the drawings, wherein like reference characters designate like or corresponding parts throughout the several views, there is shown in Fig. 1 a desk 10 upon which is mounted a table 11, the table being comprised of three telescoping legs 12, 13, 14. Mounted on the top 16 of said table is a platform 17 and rubber cups 21 are mounted on the lower ends of each of the legs to prevent slippage of the instrument.

Mounted on a crosspiece 22 intermediate legs 12, 13 is a second platform 23. The crosspiece is connected to the legs in a tube and socket connection with thumbscrews 15 permitting vertical adjustment of platform 23. Both platforms 17 and 23 are adapted to be tilted by means of universal joints 18, 19 respectively. Resting upon the first and higher platform 17 are a pair of standards 24, each of said standards having a bracket 25 at its uppermost portion and mirrors 26 attached parallel to said standards. The brackets 25 are pivotally mounted by means of bolts 31 to a pair of eyepieces 30 said eyepieces being in fixed relationship one to the other. Within each of said eyepieces is a prism or semi-transparent mirror 32 and a glass 33 affixed on one side adjacent mirrors 26.

The viewing instrument described above operates in the following manner. A mosaic or large-scale photo image 40 is placed on the intermediate platform 23 and a second map or photograph 41 is placed on platform 17. The intermediate platform 23 is adapted to be raised to any desired elevation by screws 15 whereas the distance from platform 17 to mirror 26 is fixed by the basic design of the instrument. By the adjustment of intermediate platform 23, the difference in scales between maps or photographs 40, 41 are compensated when an examination of said maps is made simultaneously through eyepieces 30. Any changes between the two maps or photographs are readily detectable and may be transferred to a third map or photograph 42 having a third scale.

Figure 2:
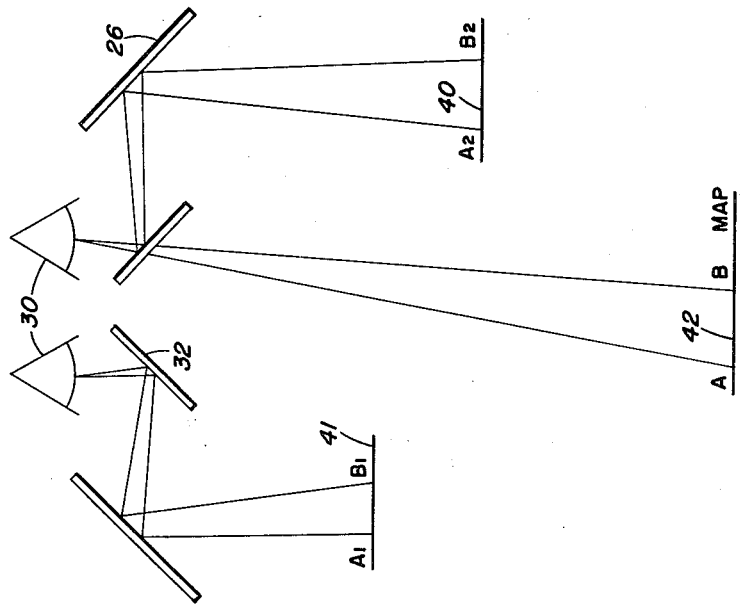
Fig. 2 shows a schematic diagram illustrating the principles involved in transferring information from maps of two different scales to a third map having a third scale.

Attention is invited to Fig. 2 wherein a schematic diagram of the principles involved in the Fig. 1 prototype are shown. Rays of light through eyepieces 30 are reflected on prisms or semi-transparent mirrors 32 and bend at approximately right angles to strike mirrors 26. From the latter mirrors, the light rays are reflected downwardly to image $A_1B_1$ on map 41 and image $A_2B_2$ on map 40. Thus, by looking through the eyepiece 30, a viewer will see both images simultaneously. Although maps 40, 41 are of different scales, the difference in scale is compensated by the difference in distance of each map from eyepiece 30. The prisms 32 are constructed in such a manner that the viewer may also see directly below the prism and thus see a third image AB with one eye. Since the image AB is of a different distance from eyepiece 30 than images $A_1B_1$ and $A_2B_2$, said image AB has a different scale than the latter two images, thus permitting the plotting of a new map or photograph 42 of different scale and having all of the elements shown in maps or photographs 40, 41.

Figure 3:
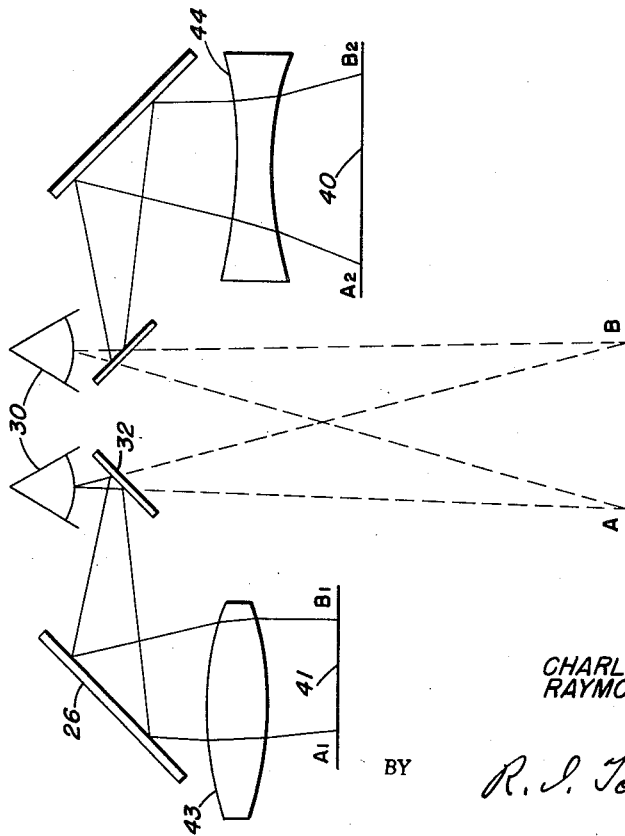
Fig. 3 shows a schematic diagram of the device illustrating the use of lenses for interpreting maps or photographs of different scales.

The above principle is easily applied since the eyes of the operator are capable of focusing independently of each other at different distances if such differences are not too great. In a simple mirror sterescope, the normal focusing distance is approximately twelve inches. If one eye focuses at a distance of twelve inches, it is not difficult for the other eye to focus on an object three or four inches away. If the two photographs 40, 41 of Figs. 1 and 2 vary a large degree in scale, the difference in their respective distance to the eyepiece must necessarily increase. In order to make the difference between the two distances as small as possible, one or more adjustable lenses may be placed within the optical path in order to change the focal length. By way of example, Fig. 3 illustrates the use of a simple magnifying glass 43 placed between the small-scale image $A_1B_1$ of map 41 and mirror 26. The glass 43 is adjustable so that proper focus may be obtained without moving the distance between the eyepiece 30 and map 41 and the magnifying glass thus enlarges the angle of reflected light entering the left side of the eyepiece 30 as viewed from Fig. 3, so that the two objects seen by the eyes are approximately the same size. Stereoptic vision is then possible. It may also be desirable to reduce the larger image $A_2B_2$ of map 40. In such case, an independently adjustable reducing glass 44 is placed over the large-scale image, $A_2B_2$ of map 40, thereby reducing the convergence angle of incident of light of map 40 to the eye. Either or both the magnifying glass 43 and reducing glass 44 may be used, depending on the difference in scale of the two photographs 40, 41. The lenses may also be placed between the prisms 32 and mirrors 26 if desired (not shown).

Obviously many modifications and variations of the present invention are possible in the light of the above teachings. It is therefore to be understood that within the scope of the appended claims the invention may be practiced otherwise than as specifically described.

What is claimed is:

1. An instrument for plotting information from two photographs of different scales to a map base having a third scale comprising: a tripod having adjustable legs, a table top supported by said tripod, a map base, said tripod resting on said map base, a first platform, a first universal joint attached to said table top, said first platform being movably attached to said first universal joint, a crosspiece extending between two legs of said tripod, means connected to said crosspiece for vertically adjusting said crosspiece on said legs, a second universal joint attached to said crosspiece, a second platform movably attached to said second universal joint, a pair of standards resting on said table top, a pair of eyepieces in fixed relationship one to the other, one eyepiece being pivotally mounted to each of said standards so that said standards can be pivoted outwardly, a semi-transparent mirror mounted in each of said eyepieces, a mirror carried on each of said standards providing optical paths between said platforms and said semi-transparent mirrors whereby photographs placed on said platforms may be viewed simultaneously with said map base and said mirror being movable with said standard to compensate for tilt.

2. The device of claim 1 further comprising a lens independently adjustable parallel to the optical path for changing the size of an image, said lens being inserted within said optical path whereby the difference in apparent distance from said eyepieces to said photographs is reduced.

3. The device of claim 1 further comprising a magnifying lens for increasing the apparent size of a small-scale photograph, a reducing lens for reducing the apparent size of a large-scale image, said lenses being inserted within said optical paths and independently adjustable parallel thereto whereby the difference in apparent distance from said eyepieces to said photographs is reduced.

References Cited in the file of this patent

UNITED STATES PATENTS

| | | |
|---|---|---|
| 1,693,527 | Reeves | Nov. 27, 1928 |
| 2,229,424 | Seely | Jan. 21, 1941 |
| 2,246,604 | Smith | June 24, 1941 |
| 2,352,570 | Seely | June 27, 1944 |
| 2,555,106 | Beazley | May 29, 1951 |
| 2,704,960 | Loud | Mar. 29, 1955 |

FOREIGN PATENTS

| | | |
|---|---|---|
| 400,318 | France | May 29, 1909 |